United States Patent
Chen et al.

(10) Patent No.: US 9,092,047 B2
(45) Date of Patent: Jul. 28, 2015

(54) METHOD AND SYSTEM FOR CONTENT AGGREGATION VIA A BROADBAND GATEWAY

(75) Inventors: Xuemin Chen, Rancho Sante Fe, CA (US); Jeyhan Karaoguz, Irvine, CA (US); Wael William Diab, San Francisco, CA (US); David Garrett, Tustin, CA (US); David Albert Lundgren, Mill Valley, CA (US); Rich Prodan, Niwot, CO (US)

(73) Assignee: BROADCOM CORPORATION, Irvine, CA (US)

( * ) Notice: Subject to any disclaimer, the term of this patent is extended or adjusted under 35 U.S.C. 154(b) by 222 days.

(21) Appl. No.: 12/982,305

(22) Filed: Dec. 30, 2010

(65) Prior Publication Data

US 2011/0299411 A1    Dec. 8, 2011

Related U.S. Application Data

(60) Provisional application No. 61/351,696, filed on Jun. 4, 2010.

(51) Int. Cl.
| | |
|---|---|
| G05F 1/66 | (2006.01) |
| G06Q 20/10 | (2012.01) |
| G06Q 30/02 | (2012.01) |
| G06Q 30/04 | (2012.01) |
| H04L 12/857 | (2013.01) |

(Continued)

(52) U.S. Cl.
CPC *G05F 1/66* (2013.01); *G05B 13/02* (2013.01); *G06F 21/10* (2013.01); *G06Q 20/10* (2013.01); *G06Q 30/0215* (2013.01); *G06Q 30/0226* (2013.01); *G06Q 30/04* (2013.01); *G06Q 40/12* (2013.12); *H04L 47/2491* (2013.01); *H04L 65/102* (2013.01); *H04L 65/40* (2013.01); *H04L 67/10* (2013.01); *G06F 2221/07* (2013.01); *H04L 41/32* (2013.01); *H04L 41/5019* (2013.01)

(58) Field of Classification Search
CPC combination set(s) only.
See application file for complete search history.

(56) References Cited

U.S. PATENT DOCUMENTS

| | | | |
|---|---|---|---|
| 2003/0217125 A1* | 11/2003 | Brancati et al. | 709/220 |
| 2004/0153500 A1* | 8/2004 | Ide et al. | 709/203 |

(Continued)

*Primary Examiner* — Ian N Moore
*Assistant Examiner* — Eric H Wang
(74) *Attorney, Agent, or Firm* — Foley & Lardner LLP; Christopher J. McKenna; Paul M. H. Pua (57) ABSTRACT

A broadband gateway, which enables communication with a plurality of devices, handles at least one physical layer connection to at least one corresponding network access service provider. The broadband gateway determines network channel conditions for a requested service and identifies a user profile for a requesting device. The broadband gateway negotiates a service profile for the requested service with the at least one network access service provider based on the determined network conditions and the identified user profile. Content may be acquired and received for the requested service from the at least one network access service provider utilizing the negotiated service profile. The broadband gateway aggregates and assembles the received content. The resulting assembled content is communicated to the requesting device for the requested service. The broadband gateway may relay content among peer devices. Content conversion may be performed during the relay communication to match user profiles of subsequent peer devices.

20 Claims, 5 Drawing Sheets

(51) Int. Cl.
*G06Q 40/00* (2012.01)
*H04L 29/08* (2006.01)
*H04L 29/06* (2006.01)
*G06F 21/10* (2013.01)
*G05B 13/02* (2006.01)
*H04L 12/24* (2006.01)

(56) References Cited

U.S. PATENT DOCUMENTS

2008/0168523 A1\* 7/2008 Ansari et al. .................. 725/131
2010/0125567 A1\* 5/2010 Morris .......................... 707/722
2010/0184405 A1\* 7/2010 Chen et al. .................... 455/410

\* cited by examiner

METHOD AND SYSTEM FOR CONTENT AGGREGATION VIA A BROADBAND GATEWAY

CLAIM OF PRIORITY

This patent application makes reference to, claims priority to and claims benefit from U.S. Provisional Patent Application Ser. No. 61/351,696 filed on Jun. 4, 2010.

The above stated application is hereby incorporated herein by reference in its entirety

INCORPORATION BY REFERENCE

This application also makes reference to:
U.S. patent application Ser. No. 12/355,377 filed on Jan. 16, 2009;
U.S. patent application Ser. No. 12/355,413 filed on Jan. 16, 2009;
U.S. patent application Ser. No. 12/355,480 filed on Jan. 16, 2009;
U.S. patent application Ser. No. 12/395,383 filed on Feb. 27, 2009;
U.S. patent application Ser. No. 12/982,321 filed on Dec. 30, 2010;
U.S. patent application Ser. No. 12/982,355 filed on Dec. 30, 2010;
U.S. patent application Ser. No. 12/981,971 filed on Dec. 30, 2010;
U.S. patent application Ser. No. 12/981,933 filed on Dec. 30, 2010;
U.S. patent application Ser. No. 12/982,216 filed on Dec. 30, 2010;
U.S. patent application Ser. No. 12/984,433 filed on Dec. 30, 2010;
U.S. patent application Ser. No. 12/982,205 filed on Dec. 30, 2010;
U.S. patent application Ser. No. 12/982,353 filed on Dec. 30, 2010;
U.S. patent application Ser. No. 12/981,966 filed on Dec. 30, 2010;
U.S. patent application Ser. No. 12/982,453 filed on Dec. 30, 2010;
U.S. patent application Ser. No. 12/982,172 filed on Dec. 30, 2010;
U.S. patent application Ser. No. 12/982,429 filed on Dec. 30, 2010;
U.S. patent application Ser. No. 12/981,990 filed on Dec. 30, 2010;
U.S. patent application Ser. No. 12/982,442 filed on Dec. 30, 2010;
U.S. patent application Ser. No. 12/982,000 filed on Dec. 30, 2010;
U.S. patent application Ser. No. 12/982,010 filed on Dec. 30, 2010;
U.S. patent application Ser. No. 12/982,022 filed on Dec. 30, 2010;
U.S. patent application Ser. No. 12/981,986 filed on Dec. 30, 2010;
U.S. patent application Ser. No. 12/982,236 filed on Dec. 30, 2010;
U.S. patent application Ser. No. 12/982,091 filed on Dec. 30, 2010;
U.S. patent application Ser. No. 12/982,213 filed on Dec. 30, 2010;
U.S. patent application Ser. No. 12/982,166 filed on Dec. 30, 2010;
U.S. patent application Ser. No. 12/982,340 filed on Dec. 30, 2010;
U.S. patent application Ser. No. 12/982,073 filed on Dec. 30, 2010;
U.S. patent application Ser. No. 12/982,501 filed on Dec. 30, 2010;
U.S. patent application Ser. No. 12/982,206 filed on Dec. 30, 2010;
U.S. patent application Ser. No. 12/982,440 filed on Dec. 30, 2010;
U.S. patent application Ser. No. 12/982,171 filed on Dec. 30, 2010;
U.S. patent application Ser. No. 12/982,223 filed on Dec. 30, 2010;
U.S. patent application Ser. No. 12/982,477 filed on Dec. 30, 2010;
U.S. patent application Ser. No. 12/982,331 filed on Dec. 30, 2010;
U.S. patent application Ser. No. 12/982,036 filed on Dec. 30, 2010;
U.S. patent application Ser. No. 12/982,196 filed on Dec. 30, 2010;
U.S. patent application Ser. No. 12/982,391 filed on Dec. 30, 2010;
U.S. patent application Ser. No. 12/982,405 filed on Dec. 30, 2010;
U.S. patent application Ser. No. 12/981,753 filed on Dec. 30, 2010;
U.S. patent application Ser. No. 12/982,414 filed on Dec. 30, 2010;
U.S. patent application Ser. No. 12/981,733 filed on Dec. 30, 2010;

Each of the above stated applications is hereby incorporated herein by reference in its entirety.

FIELD OF THE INVENTION

Certain embodiments of the invention relate to broadband gateways. More specifically, certain embodiments of the invention relate to a method and system for content aggregation via a broadband gateway.

BACKGROUND OF THE INVENTION

With the continuous growth of digital television or broadcast multimedia, and/or broadband access, which may be used in conjunction with online businesses, social networks, and/or other online services and applications, users may desire having access to a larger number of providers and/or a broader range of content in a manner that is flexible and/or suits the users' lifestyles. Most users connect to the Internet using web browsers running on personal computers (PCs). Furthermore, most households may have one or more televisions that may be used to view television and/or multimedia broadcasts. Television broadcasts may include terrestrial TV, Cable-Television (CATV), satellite TV and/or Internet Protocol television (IPTV) based broadcasts. To ensure against unauthorized reception and/or use of TV and/or multimedia broadcast, service providers may require use of dedicated set-top boxes (STBs) that may be used to encrypt broadcast signals communicated from the service providers to generate suitable video and/or audio streams that may be played via televisions and/or other display/playback devices in the household. Furthermore, STBs and/or TVs may support Internet access. Thus, rather than using a computer to access the Internet, a user may find it more convenient to use the flat screen televisions and/or monitors in homes for the same purpose. To do so, for example, an STB connected to a flat screen television may be provided with web browsing software and protocols, and Internet connectivity, which may enable the user to easily access the Internet or check their electronic mail (email), for example, from a convenient and comfortable location such as their living room.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for content aggregation via a broadband gateway, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for content aggregation via a broadband gateway. In various embodiments of the invention, a broadband gateway, which enables communication with a plurality of devices, is operable to handle at least one physical layer connection to at least one corresponding network access service provider. In this regard, the at least one physical layer connection may comprise a plurality of physical layer connections and the at least one corresponding network access service provider may comprise a plurality of access service providers. Each of the plurality of physical layer connections corresponds to a respective one of the plurality of corresponding access service providers. The broadband gateway may determine network channel conditions for a requested service and identify a user profile for a requesting device. The broadband gateway may negotiate a service profile for the requested service with the at least one network access service provider based on the determined network conditions and the identified user profile. The broadband gateway may receive content for the requested service. The broadband gateway may acquire content for the requested service from the at least one network access service provider utilizing the service profile. Different service providers may provide content comprising different content quality, format and/or transmission rates. The broadband gateway may aggregate and assemble the corresponding content for the requested service. The assembled content may be communicated to the requesting device for the requested service. Content may be relayed via the broadband gateway among peer devices. The broadband gateway may perform content conversion during the relay communication to match user profiles of subsequent peer devices.

Figure 1:
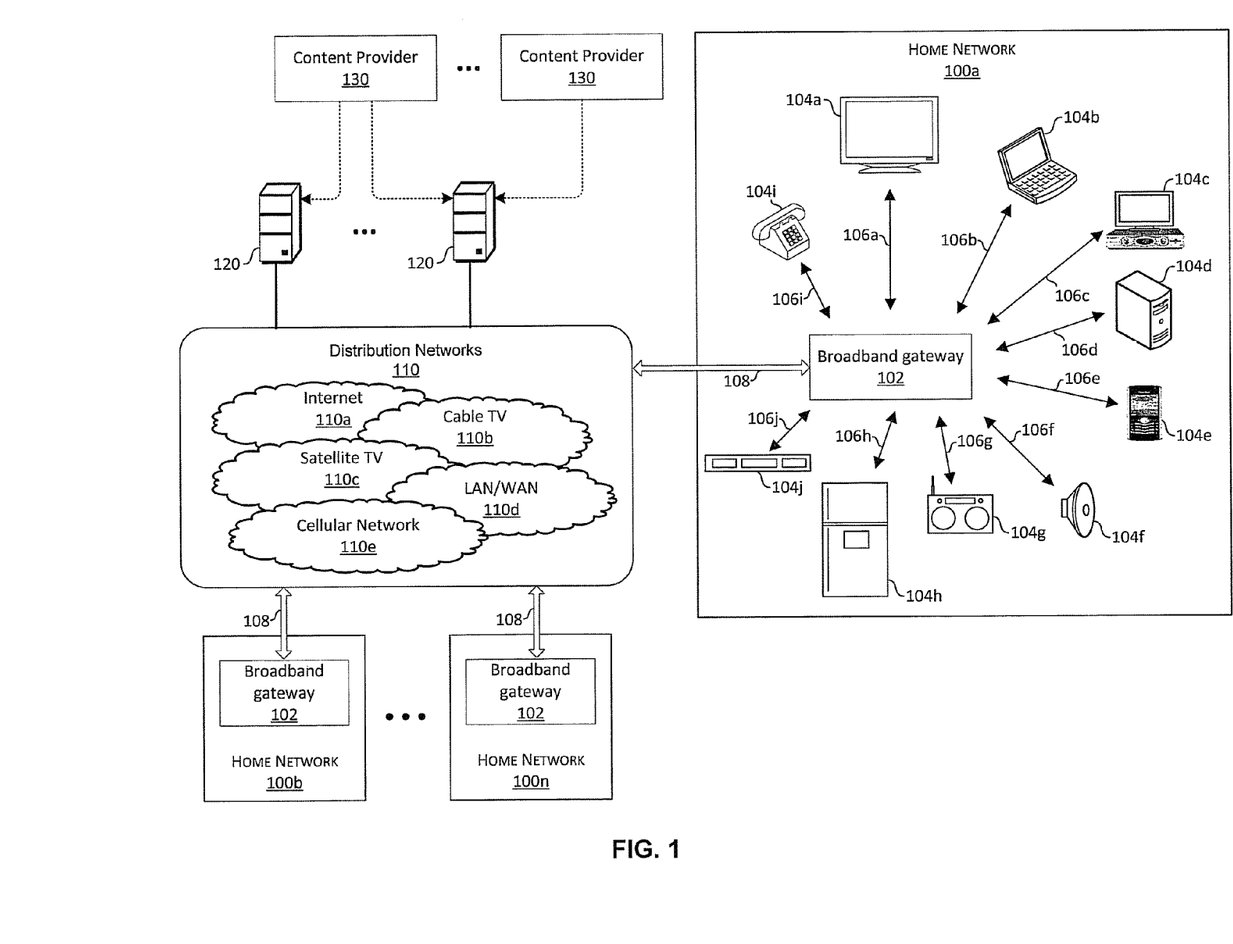
FIG. 1 is a block diagram illustrating an exemplary communication system that comprises a home network serviced by a broadband gateway, in accordance with an embodiment of the invention.

FIG. 1 is a block diagram illustrating an exemplary communication system that comprises a home network serviced by a broadband gateway, in accordance with an embodiment of the invention. Referring to FIG. 1, there is shown a home network 100a, a plurality of distribution networks 110, a plurality of service providers 120, and a plurality of content providers 130. The home network 100a may be serviced by a broadband gateway 102. Also shown in FIG. 1 are additional home networks 100b, . . . , 100n. Each of the home networks 100b, . . . , 100n may also be serviced by a broadband gateway 102.

The service providers 120 may comprise various entities which may provide various services using different access technologies to devices 104 via the gateway 102 and/or to the gateway 102 itself. The services may include, but are not limited to, multimedia, television, Internet, phone, Ethernet, multimedia over coax alliance (MoCA), passive optical network (PON), and/or cellular services, for example. Some of the service providers 120 may comprise network access service providers which provide physical layer connections to the gateway 102. Such physical layer connections may then be utilized to access, and/or may be part of, the distribution networks 110. In this regard, "network access service provider" as utilized herein, is distinguished from the more generic term "service provider" which may encompass services other than providing physical layer access to a network. Cable television providers, plain old telephone service (POTS) providers, digital subscriber line (DSL) providers, cellular providers, WiMAX providers, and satellite providers are examples of network access service providers.

The content providers 130 may generate, capture, and/or package content, such as multimedia content, that may be distributed to end-users. The content may comprise, for example, audio, video, e-book, gaming, and/or other content. The content may be, for example, downloadable and/or streaming, rented and/or purchased. In some instances, a content provider and a service provider may be separate. In some instances, as indicated by the dashed line 106, a single provider may provide both content and services. For example, an entity that functions as a network access service provider may also provide content and/or services other than network access and, thus, that entity may also be accurately referred to as a "content provider" and/or a "service provider." Content and/or services that are provided by a content provider 130 and/or a service provider 120 may be provided to the gateway 110 via a physical layer connection provided by a network access service provider 120.

The plurality of distribution networks 110 may comprise one or more networks that may be operable to enable wireless and/or wired communication among a plurality of entities based on one or more networking and/or communication infrastructures. In this regard, the plurality of distribution networks 110 may be utilized to enable distributing multimedia content generated by the content providers 130, directly and/or via the service providers 120, to end-users. The network connectivity available via the plurality of distribution networks 110 may be based on one or more communication standards and/or protocols. The plurality of distribution networks 110 may comprise, for example, the Internet 110a, a CATV network 110b, a satellite television (TV) network 110c, a wireless local area network/wide area network (LAN/WAN) 110d, and/or a cellular network 110e.

The Internet 110a may comprise a system of interconnected networks to enable exchange of data between a plurality of nodes, based on one or more networking standards, including, for example, the Internet Protocol (IP). For example, the Internet 110a may enable connectivity among a plurality of private and public, academic, business, and/or government nodes and/or networks. The physical connectivity may be provided in the Internet 110a via, for example, the Public Switched Telephone Network (PSTN), copper wires, fiber-optic cables, wireless interfaces, and/or other protocols and/or standards-based interfaces. The transport functionality may be performed in the Internet 110a based on, for example, one or more protocols, such as the Transmission Control Protocol/IP (TCP/IP), for example. The CATV network 110b may comprise suitable distribution nodes, systems, and/or subnetworks that may enable forwarding of communication between CATV providers and a plurality of cable-TV consumers. For example, the CATV network 110b may comprise a network of fiber optics and/or coaxial cables for use in CATV broadcasts. The satellite TV network 110c may comprise suitable distribution nodes, systems, and/or subnetworks that may enable communication of satellite TV broadcast by satellite TV providers to a plurality of consumers. For example, the satellite network 110c may comprise a plurality of orbiting satellite nodes and/or one or more terrestrial centers in a satellite-TV system.

The LAN/WAN network 110d may comprise suitable logic, circuitry, interfaces, and/or code that may be operable to enable implementation of one or more wired and/or wireless LAN or WAN standards and/or protocols. Exemplary WAN technologies comprise, for example, WiMAX-based networks. Exemplary LAN technologies may comprise, for example, those based on IEEE 802.11 standards, including, for example, WiFi-based networks. The cellular network 110e may comprise suitable logic, circuitry, interfaces and/or code that may be operable to enable communication via one or more cellular technologies. Exemplary cellular technologies may comprise Code Division Multiple Access (CDMA), wideband CDMA (WCDMA), CDMA1000, High-Speed Downlink Packet Access (HSDPA), Global System for Mobile Communications (GSM), General Packet Radio Services (GPRS), Enhanced Data Rates for Global Evolution (EDGE), and/or Universal Mobile Telecommunication System (UMTS). The cellular network 110e may comprise, for example, a plurality of control and/or switching nodes, and a plurality of base stations that enable transmission and/or reception of cellular based communications between the cellular network 110e and cellular capable devices.

The home network 100a may correspond to a location that may comprise a plurality of devices 104 which may be serviced and/or managed by the broadband gateway 102. In this regard, the location may be a residence (e.g., home, apartment), a small business, a school, a library, and/or other like settings in which users may want to obtain access to service and/or to content provider networks. The broadband gateway 102 may be utilized in the home network 100a to provide connectivity between the home network 100a and the service providers 120 (and/or the content providers 130) via the distribution networks 110.

The broadband gateway 102 may comprise suitable logic, circuitry, interfaces, and/or code that may be operable to provide connectivity between one or more devices in a home network, such as the home network 100a, and a plurality of external networks. For example, the broadband gateway 102 may handle a plurality of broadband physical layer connections 108 to the distribution networks 110. The broadband physical layer connections 108 may comprise wired, optical, and/or wireless connections between the broadband gateway 102 and the distribution networks 110, which may enable communication between the broadband gateway 102 and the service providers 120. The broadband gateway 102 may operate as an interface device that may allow one or more service and/or content providers to interact with various devices in the home network. In this regard, the broadband gateway 102 may be operable to perform and/or provide various services that may pertain to enabling and/or facilitating reception of content from one or more content providers, wherein the content may be delivered through one or more services providers. For example, the broadband gateway 102 may be operable to perform such operations as network access related processing (e.g., PHY/MAC, transport layer processing), encryption and/or decryption, user and/or account authentication, and/or at least some of video and/or audio processing operations that may be needed for consumption of multimedia content. The broadband gateway 102 may communicate with various devices in the home network 100, using wired and/or wireless communication links.

A single broadband gateway 102 may be operable to handle multiple physical layer (i.e., layer 1 of the open-systems interconnection model (OSI)) connections 108 to multiple ones, or portions, of the distribution networks 110, where different ones or portions of the distribution network(s) 110 are owned, operated, leased, or otherwise associated with different network access service providers 120. For example, a first network access service provider 120 may provide network access to the gateway 102 via a DSL connection over twisted-pair cabling, and a second network access service provider 120 may provide network access to the gateway 102 via a cable television connection over coaxial cabling. In some instances, the gateway 102 may be operable to concurrently communicate over multiple physical layer connections provided by multiple network access service providers.

The broadband gateway 102 may also be operable to provide and/or support various other, non-content related services in the home network 100. For example, the broadband gateway 102 may be operable to provide energy management in the home network 102, by controlling and/or adjusting configuration of one or more devices in the home network to reduce power consumption for example.

Devices serviced by, and/or connected with the broadband gateway 102 may comprise content consuming devices and/or other, non-content consuming household or home devices that may be operable to interact with the broadband gateway 102. For example, the broadband gateway 102 may service, and/or may communicate with a plurality of home devices 104a-104j in the home network 100a. The home devices may comprise, for example, one or more of a television 104a, a laptop computer 104b, a smoke detector, a carbon monoxide detector, and/or a security alarm 104c, a computer and/or server 104d, a mobile phone 104e, a speaker 104f, an AM/FM radio 104g, a phone 104h, an appliance 104i (e.g., refrigerator), and a digital video recorder (DVR) or personal video recorder (PVR) 104*j*. The broadband gateway 102 may interact with each of the home devices 104*a*-104*j* via links 106*a*-106*j*, which may be supported by the broadband gateway 102 and the corresponding home device. For example, the link 106*a* between the broadband gateway 102 and the television 104*a* may comprise a High-Definition Multimedia Interface (HDMI) cable and/or 60 GHz WiGig wireless connection/interface. The link 106*b* may comprise, for example, a wired Ethernet link, a wireless Ethernet link, a Universal Serial Bus (USB) link, or an IEEE 1394 link. The link 106*c* may comprise, for example, a two-wire link or a wireless link. The link 106*d* may comprise, for example, a wired Ethernet link, a wireless Ethernet link, a USB link, or an IEEE 1394 link. The link 106*e* may comprise, for example, a wireless Ethernet link, a USB link, or a cellular link. The link 106*f* may comprise speaker wire and/or a wireless link. The link 106*g* may comprise, for example, AM and/or FM radio transmissions broadcast received using the broadband gateway 102. The link 106*h* may comprise, for example, a phone line. The link 106*i* may comprise, for example, a wired or wireless Ethernet link. The link 106*j* may comprise, for example, a wired or a wireless link.

In the exemplary embodiment of the invention illustrated in FIG. 1, although the devices 104*a*-104*j* may communicate only the broadband gateway 102 as shown, the invention may not be so limited. Accordingly, the devices 104*a*-104*j* may communicate with multiple broadband gateways in a local or home network without departing from the spirit and scope of various embodiments of the invention.

As illustrated in FIG. 1, a plurality of home networks 100*b*, ..., 100*n*, may also be connected to the distribution networks 110. These home networks 100*b*, ..., 100*n* may operate in substantially the same manner as the home network 100*a*. By having multiple home networks connected to the distribution networks 110, various applications, such as peer-to-peer communication and/or data aggregation operations may be possible by utilizing the broadband gateways 102 in the home networks.

In operation, one or more of the devices 104*a*-104*j* may request that content for a requested service be delivered to it via the broadband gateway 102. In an embodiment of the invention, upon receiving a service request from, for example, the device 104*a*, the broadband gateway 102 may be operable to concurrently examine channel conditions for associated networks and a user profile associated with the device 104*a*. In this regard, the broadband gateway 102 may determine network conditions and identify an associated user profile for the device 104*a*.

The determined network conditions may comprise one or more service providers supporting the requested service, available network resources and network quality. The one or more service providers may each provide at least a portion of content for the requested service. The available network resources may comprise physical layer connections, time slots, power and/or bandwidths available for the requested service. The network quality may comprise information such as, for example, varying bandwidth, variable bit error rate, and/or unexpected quality degrade. The user profile for the device 104*a* may comprise device power usage information, device service processing capabilities and/or user selections. The device service processing capabilities may comprise information such as, for example, supported physical layer connections, service bandwidth requirement, and/or content coding and transcoding capabilities for the requested service.

The broadband gateway 102 may negotiate a service profile for the requested service with the associated networks and/or the one or more service providers utilizing the determined network conditions and the identified user profile for the device 104*a*. The service profile may comprise a set of attributes describing the requested service, for example, type of service, type of content, service providers, connections and corresponding quality of service (QoS) for the requested service. The broadband gateway 102 may store the service profile to assist in the transcoding and/or content delivery process within the home network 100*a* for the requested service when needed.

In an embodiment of the invention, content for the requested service may be provided by one or more service providers. In this regard, each of the one or more service providers may provide at least a portion of content required for the requested service. Depending on system configuration, content provided by the one or more service providers may or may not overlap. For example, assume that the requested service is a layered video service comprising five layer videos, namely, one base layer video and four enhancement layer videos. Assume also that two service providers may provide content for the same layered video service. The first service provider may provide content for the base layer video and the first two enhancement layer videos. The second service provider may provide content for the rest three enhancement layer videos. In addition, the two service providers may distribute the corresponding content over different connections and thereby may communicate the corresponding content, for example, in different content quality, format and/or transmission rates, to the broadband gateway 102. In this regard, the broadband gateway 102 may acquire corresponding content for the requested service from the one or more service providers utilizing the service profile. Content acquired from different service providers may be in different content quality, format and/or transmission rates. The broadband gateway 102 may aggregate or accumulate the corresponding acquired content from the one or more service providers. The resulting aggregated content may be assembled for the requested service. For example, the broadband gateway 102 may be operable to weight and/or combine one or more portions of the acquired content based on corresponding content quality. The assembled content may be communicated to a requesting device such as the device 104*a* for the requested service.

In an embodiment of the invention, the broadband gateway 102 may be operable to support a peer-to-peer service within a home network 100*a*. A peer-to-peer service is provided by relaying or communicating content among peer devices such as the devices 104*a*-104*j* within the home network 100*a* through the broadband gateway 102. For example, the broadband gateway 102 may receive content uploaded by, for example, the device 104*c*. The uploaded content from the device 104*c* may be desirable to other subsequent devices such as the device 104*e*. The broadband gateway 102, before relaying the uploaded content to the device 104*e*, may identify or determine a user profile associated with the device 104*e*. In instances where the content from the device 104*c* is uploaded in a transmission rate of 500 kbps, however, the device 104*e* may handle or receive content in a transmission rate of 200 kbps, the broadband gateway 102 may be required to relay or deliver the uploaded content to the device 104*b* at a decreased transmission rate, namely, 200 kbps. In this regard, the broadband gateway 102 may convert the uploaded content to fit a transmission rate of 200 kbps before delivering or relaying the uploaded content to the device 104*e*. In instances where the uploaded content from the device 104*c* is in MPEG4 format, however, the device 104*e* may only handle or receive content in MPEG2 format. In this regard, the broadband gateway 102 may convert the uploaded content by transcoding the uploaded MPEG4 content into MPEG2 content as required by the identified user profile for the device 104e. The converted content may then be communicated or relayed to the device 104e, accordingly.

Figure 2:
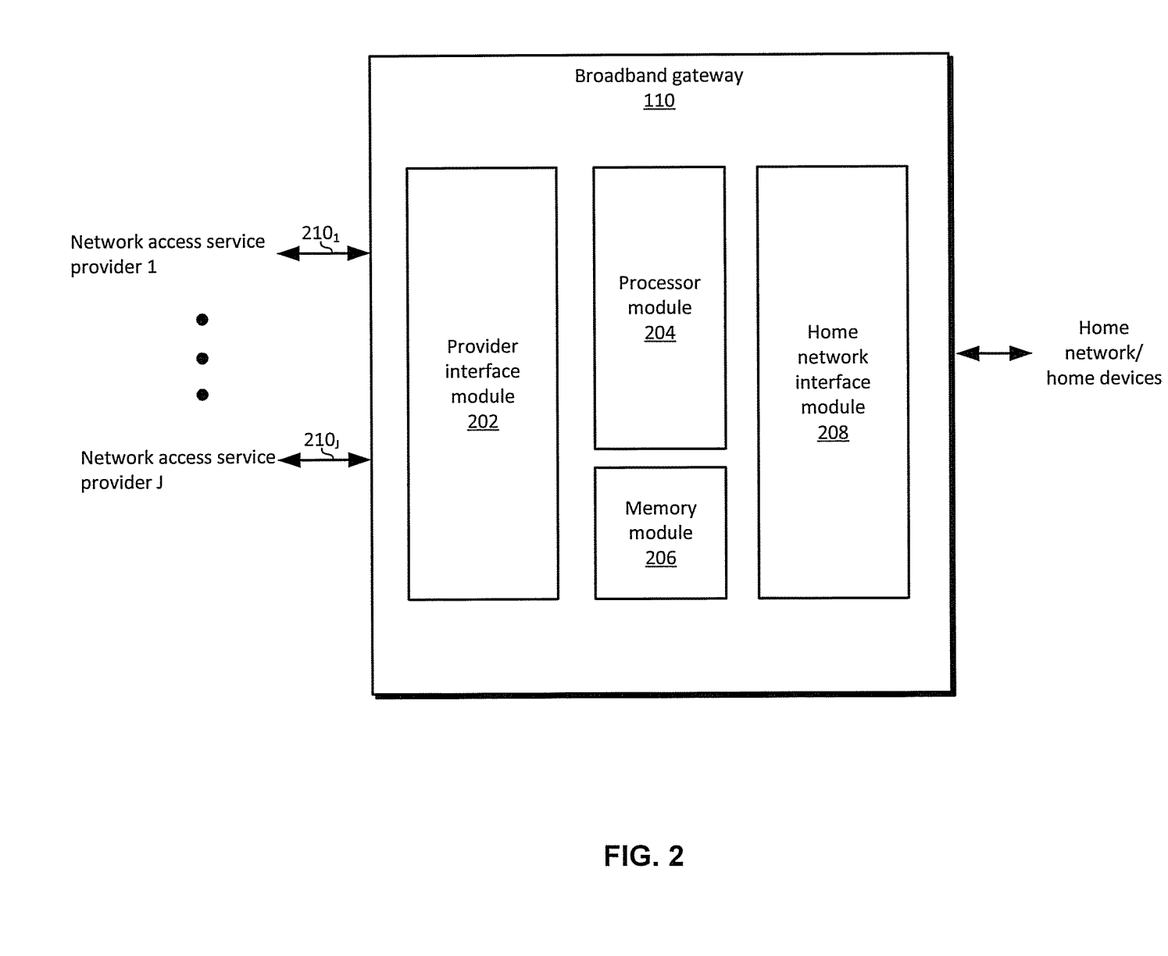
FIG. 2 is a diagram illustrating an exemplary broadband gateway, which may be operable to aggregate content from one or more service providers for a requested service in a home network, in accordance with an embodiment of the invention.

FIG. 2 is a diagram illustrating an exemplary broadband gateway, which may be operable to aggregate content from one or more service providers for a requested service in a home network, in accordance with an embodiment of the invention. Referring to FIG. 2, the broadband gateway 102 may comprise suitable logic, circuitry, code, and/or interfaces that may be operable to provide connectivity between one or more networks, such as the distribution networks 110 shown in FIG. 1, for example, and one or more devices in a home network, such as the home devices 104a-104j in the home network 100a shown in FIG. 1.

The broadband gateway 102 may operate as an interface device that allows one or more devices in the home network to access one or more networks, and to access various services and/or content via those one or more networks. For example, the broadband gateway 102 may be utilized to enable interaction between the plurality of service providers 120 and/or the plurality of content providers 130, and the home devices 104a-104j. The broadband gateway 102 may communicate or interact with one or more service providers for a service requested by the home devices 104a-104j. In this regard, upon receiving a service request from the home device 104a, for example, the broadband gateway 102 may determine network conditions and identify a user profile associated with the device 104a. The broadband gateway 102 may communicate with the associated networks to identify one or more service providers that may be operable to provide at least a portion of the content for the requested service. In this regard, content provided by the identified one or more service providers may be different portions of content or the same portions of content for the requested service. The broadband gateway 102 may negotiate a service profile for the requested service with the associated networks and/or the identified one or more service providers based on the determined network conditions and the identified user profile for the device 104a. The broadband gateway 102 may store the service profile for subsequent content aggregation for the requested service. The broadband gateway 102 may acquire content for the requested service supported by the identified one or more service providers based on the stored service profile. The broadband gateway 102 may aggregate or accumulate the acquired content. The aggregated content may be assembled to be provided or communicated to the device 104a for the requested service. In addition, the broadband gateway 102 may support a peer-to-peer technology to relay or communicate content among peer devices within an associated home network 100a. For example, content received from, for example, the device 104a, may be relayed or delivered to another device such as the device 104e within the home network 104e. In this regard, the broadband gateway 102 may convert the received content to match a user profile associated with the device 104e. The converted content may be communicated or provided to the device 104e via the broadband gateway 102.

The broadband gateway 102 may communicate with the various devices via a home network that may comprise wired and/or wireless communication links, such as the home network 100a. In this regard, the broadband gateway 102 may comprise suitable hardware and/or software to provide some or all of the functions and/or operations of one or more of a modem, a router, and a switch. The modem functions and/or operations may be those of a digital subscribed line (DSL) modem, a cable modem, or a wireless cable modem, for example. The router functions and/or operations may be those of a wireless router, for example. The switch functions and/or operations may be those of a network switch, or a local area network (LAN) switch, for example. In some instances, the broadband gateway 102 may communicate with the various devices in the home via more than one home network.

The broadband gateway 102 may be operable to provide energy management by varying the configuration of one or more devices in the home network. The broadband gateway 102 may collect and/or store energy-related information of the devices in the home network and/or of the links in the home network, and may utilize such information to control the operation of the home devices. For example, the broadband gateway 102 may utilize channel capacity flexibility and content coding options to minimize and/or optimize power utilization. The broadband gateway 102 may also configure and/or manage the configuration of the network between the broadband gateway 102 and one or more service/content providers based on the energy-related information associated with the devices in the home. For example, at least a portion of the distribution networks 100 may be configured and/or managed in this manner. The broadband gateway 102 may be utilized to display energy-related metrics, including consumption trends and/or costs, for example, and to display any available credits/rewards that may be redeemed by a user. In some instances, when a device in the home network is a certified device, such as a California efficient display, for example, the broadband gateway 102 may be utilized to provide that information to a service/content provider and obtain rewards/credits associated with the use of such certified devices. Moreover, overall network power consumption may be managed by sharing information among multiple interconnected broadband gateways.

The broadband gateway 102 may be operable to adapt and/or enable changes in a subscription model and/or in multimedia delivery characteristics based on the capabilities of the various devices in the home network. For example, high-definition video content may be delivered to certain type of devices, such as digital televisions (DTVs), while low-definition video content and/or text may be delivered to a different type of devices, such as personal mobile devices. In this regard, the broadband gateway 102 may be utilized to reduce bandwidth and/or processing power consumption in the home network. The broadband gateway 200 may also support and/or use multi-transport processing, which may be performed sequentially, in parallel, and/or utilizing distributed processing.

The gateway functionality associated with a user, such as security features, preferences, applications, electronic programming guides (EPGs), and user profile, for example, may be ported from the broadband gateway 102 to one or more other broadband gateways 102 in other locations. In some instances, a visitor may be allowed access to their content outside their service/content provider service area by, for example, classifying the access level for different users and/ or by providing limited access to content. Moreover, the broadband gateway 102 may allow multiple user interface software structures by, for example, standardizing an interface to service/content providers and devices in the home network.

The broadband gateway 102 may be operable to broker and/or arbitrate with service/content providers the consumption of certain services, such as music and video, for example. In some instances, the broadband gateway 102 may perform content search, transport discovery, ranking, and/or sorting. These operations may be performed based on content quality, price, quality-of-service (QOS), and network protocols supported by the devices in the home network, such as service level agreements (SLAs), for example.

Various emergency-related services in the home network may be supported by the broadband gateway 102, including allowing first responders to provide alerts to a select group of users by accessing the broadband gateway 102 via secure links provided by the service/content providers. For example, the broadband gateway 102 may enable an emergency service provider, such as those associated with the emergency service provider network 140 described above in FIG. 1, to access one or more devices in the home network.

Customized graphical user interfaces (GUIs) may be generated by the broadband gateway 102, wherein the GUIs may be used to visually display and/or provide interaction with the customized content.

For peer-to-peer communication, the broadband gateway 102 may be utilized to allow enhanced content sharing in a service/content provider network. In this regard, the broadband gateway 102 may be utilized to construct a directory service for peer-to-peer connectivity with friends and family, for example. The broadband gateway 102 may be utilized to provide incentives to users who engage in peer-to-peer communication through, for example, the distribution networks 110. Moreover, the broadband gateway 102 may be utilized to match the content coding to the service type being consumed by the user and to make the necessary allocations through the network with respect to peer-to-peer or conventional Internet programming or broadcast programming.

The broadband gateway 102 may be utilized in connection with constrained network resources, such as time of day, traffic congestion, and the like, for example, to provide incentives for a user to accept a lower cost, lower quality of service that is dynamically configured for current network conditions. In some instances, the broadband gateway 102 may allow enhanced low latency service delivery to client devices in a home network.

The broadband gateway 102 may be operable to run or execute an agent to extract content, rating, copyright, language, privacy rules, and automatically add user generated content, for example. Such agent may be run or executed in connection with the processor module 204 of the broadband gateway 102, for example. In some instances, the broadband gateway 102 may be operable to provide rating-related information or channel prediction to a service/content provider to assist with fast channel change.

Bandwidth optimization by, for example, placing future requests for bandwidth to a service/content provider and accepting the best timeslots provided in return may be enabled by the broadband gateway 102.

The broadband gateway 102 may be operable to combine and/or blend multiple contents for use as single content in the home network. Such combination may be performed in one or more of the modules of the broadband gateway 102. For example, the broadband gateway 102 may blend different video and audio contents for an event by accessing one or more service/content providers and providing automatic and/or manual content synchronization.

The protection, management, and/or tracking of confidential data, such as health and financial records, for example, by tagging the data may be provided by the broadband gateway 102. Only when a user authorizes the transfer of the confidential data will such data be stored and/or aggregated. The broadband gateway 102 may be operable to create a trusted rating mechanism for content. The broadband gateway 102 may be secure against external threats that may be downloaded from outside the home network and may provide a secure domain distribution in the home network. Automated and secured billing and payment services may also be provided by the broadband gateway 102.

The broadband gateway 102 may be operable to utilize client or home device profile information to select layered video service(s) and/or transmission. Such information may be stored, at least temporarily, in the memory module 206 of the broadband gateway 102. In some instances, the programming and/or enhanced video layers received by the broadband gateway 102 may be aggregated midstream by one or more network or routing nodes.

The broadband gateway 102 may support a reduction in the cost of unwatched content by using multi-tier billing for downloaded content, such as video content. The broadband gateway 102 may be utilized to provide a unified payment portal for collecting and/or aggregating charges from multiple service and/or content providers.

The broadband gateway 102 may comprise one or more modules. Each of these modules may comprise hardware, software, or a combination thereof that may be utilized to perform various operations associated with the broadband gateway 102. In an embodiment of the invention, the broadband gateway 102 may comprise a provider interface module 202, a processor module 204, a memory module 206, and a home network interface module 208. In some instances, the broadband gateway 102 may be such that the various modules listed above may be distributed over multiple devices. Moreover, the modules listed above are provided by way of illustration and not of limitation. Other configurations and/or architectures of the broadband gateway 102 may also be implemented. For example, the broadband gateway 102 may be a virtual gateway that is setup in a network by utilizing virtual machines (VMs) and/or next-generation (NG) data centers.

The provider interface module 202 may comprise suitable logic, circuitry, code, and/or interfaces that may be operable to receive data from and/or send data to one or more service/content providers via one or more physical layer connections 130 to one or more network access service providers. In this regard, each of the physical layer connections $130_1$-$130_j$ may connect the gateway 110 to a difference network access service provider. Each of the physical layer connections 130 may comprise a wired, optical, or wireless connection. Each of the physical layer connections 130 may utilize different physical media and/or different physical layer protocols. For example, the connection $130_1$ may comprise a DSL over twisted-pair connection and the connection $130_j$ may comprise a CATV over coaxial cable connection.

The processor module 204 may comprise suitable logic, circuitry, code, and/or interfaces that may be operable to process data received from the service/content providers and/or data received from one or more devices 104 in the home. Data received from the service/content providers via one or more physical layer connections $210_1$-$210_j$ may be processed to make it suitable for communication to a device such as the device 104a and data from the one or more devices 104 may be processed to make it suitable for communication to the service/content providers via one or more physical layer connections $210_1$-$210_j$. In this regard, the processor module 204 may comprise one or more portions that are suitable to handle communication or interactions between the plurality of service providers 120 and/or the plurality of content providers 130, and the devices 104. For example, the processor module 204 may communicate, via the provider interface module 202, with associated networks and/or service providers such as the plurality of service providers 120 for a service requested by the device 104a. The processor module 204 may communicate with associated networks via the provider interface module 202 to determine network conditions such as network channel quality. The processor module 204 may communicate with the device 104a, via the home network interface module 208, to identify a user profile associated with the device 104a. The processor module 204 may negotiate a service profile for the requested service with the associated networks and/or the one or more service providers based on the determined network conditions and the identified user profile. The service profile may be utilized to acquire content via the provider interface module 202 for the requested service. The processor module 204 may aggregate or accumulate the acquired content from the one or more service providers. The processor module 204 may assemble the aggregated content and may provide or communicate the assembled content to the device 104a, via the home network interface module 208, for the requested service. The processor module 204 may relay content among peer devices such as the devices 104a-104j to support a peer-to-peer service within the home network 110a. In this regard, the processor module 204 may perform content conversion during relay communication for the peer-to-peer service.

The processor module 204 may monitor or identify a user profile for each subsequent device during the relay communication. The processor module 204 may convert content based on the user profile for the next subsequent device. For example, the processor module 204 may receive content uploaded from the device 104a. The processor module 204, before delivering the uploaded content to the next subsequent peer device such as the device 104b, may identify or determine a user profile associated with the device 104b. The uploaded content may be compared with the identified user profile associated with the device 104b. In instances where the uploaded content from the device 104a does not match the identified user profile for the device 104b, the processor module 204 may convert the uploaded content to match the user profile associated with the device 104b. For example, the uploaded content is MPEG4 content and the device 104b only supports MPEG2 content, the processor module 204 may transcode the uploaded content from MPEG4 to MPEG2. The resulting MPEG2 content may be communicated or relayed to the device 104e via the home network interface module 208.

The processor module 204 may also be operable to generate a graphical user interface (GUI) which may be manipulated via which a user may provide input. The GUI may be displayed as part of an OSD on a local device 104, such as a monitor or television, and may be manipulated via a remote control and/or other input device that communicates directly with the broadband gateway 102. The GUI may be a web-based interface, and a user may interact with it via a computer and web browser. The GUI may be customized based on characteristics of the broadband gateway 102, the device 104 coupled to the broadband gateway 102, and the service and/or content providers associated with the broadband gateway 102. The processors module 204 may utilize the memory 206 in performing its functions.

The memory module 206 may comprise suitable logic, circuitry, code, and/or interfaces that may be operable to store data utilized in the operations of the broadband gateway 102. For example, the memory module 206 may be utilized to store configuration data, parameters, device information, tracking and/or monitoring information, security information, and intermediate processing data, for example. The memory module 206 may comprise storage media that may be integrated in the broadband gateway 102 and/or may be removable such as a removable storage device.

The home network interface module 208 may comprise suitable logic, circuitry, code, and/or interfaces that may be operable to receive data from and/or send data to one or more devices in the home network. The home network interface module 208 may be operable to support multiple communication protocols, standards, and/or data transport technologies. In this regard, the home network interface module 208 may handle one or more physical layer connections to one or more devices 104. For example, the home network interface module 208 may comprise, one or more wired and/or wireless Ethernet interfaces, one or more analog and/or digital audio outputs, one or more audio/video interfaces such as such as HDMI and DisplayPort, 60 GHz WiGig wireless connection/interface, one or more USB interfaces, one or more IEEE 1394, and/or one or more telephone jacks.

In operation, a service request may be received from a device 104a via the home network interface module 208. The processor module 204 may communicate, via the provider interface module 202, with the distribution networks 110 to determine network conditions for the requested service. The processor module 204 may also monitor, via the home network interface module 208, activities on the device 104a to identify or discover an associated user profile. The processor module 204 may negotiate a service profile for the requested service with the associated networks and/or the one or more service providers based on the determined network conditions and the identified user profile. The processor module 204 may acquire content for the requested service via the provider interface module 202. The acquired content from the different service providers may comprise different content quality, transmission rates and/or formats. The processor 204 may aggregate the acquired content from the corresponding service providers. The acquired content may be assembled or combined. The assembled content may be provided or communicated to the device 104a via the home network interface module 208. Content may be relayed among peer devices such as the devices 104a-104j within the home network 110a. The processor 204 may perform content conversion during the relay communication such that the relayed content matches a user profile associated with the next subsequent peer device.

Figure 3:
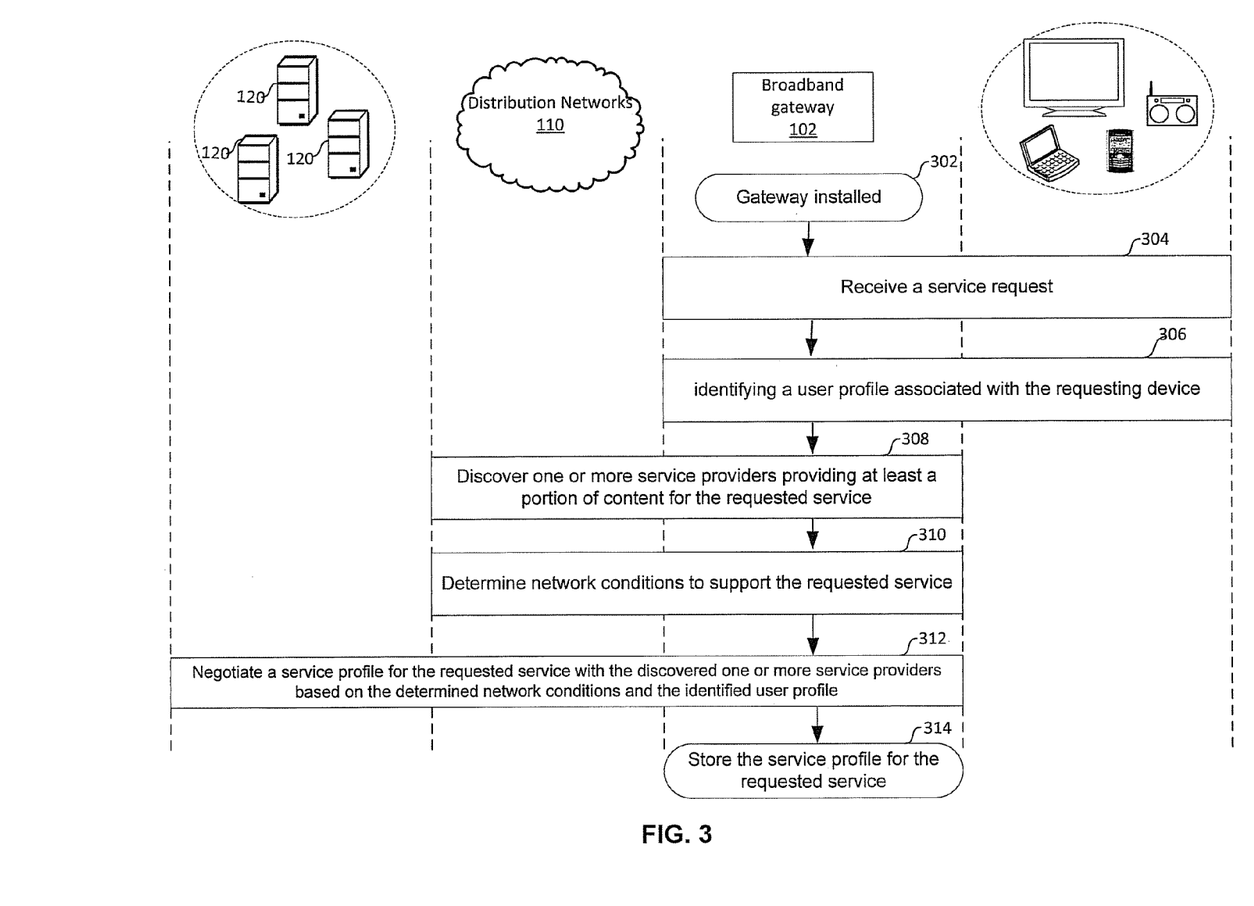
FIG. 3 is a flow chart illustrating exemplary steps that may be performed by a broadband gateway to negotiate a service profile for a requested service with one or more service providers based on corresponding network conditions and a user profile associated with a requesting device, in accordance with an embodiment of the invention.

FIG. 3 is a flow chart illustrating exemplary steps that may be performed by a broadband gateway to negotiate a service profile for a requested service with one or more service providers based on corresponding network conditions and a user profile associated with a requesting device, in accordance with an embodiment of the invention. Referring to FIG. 3, the exemplary steps may begin with step 302, in which a broadband gateway 102 may interface with the devices 104 and the service/content providers via the distribution network(s) 110. In step 304, the broadband gateway 102 may receive a service request from the device 104a, for example. In step 306, the broadband gateway 102 may identify a user profile associated with the device 104a. In step 308, the broadband gateway 102 may communicate with associated distribution networks 110 to discover one or more service providers that may provide at least a portion of content required for the requested service. In step 310, the broadband gateway 102 may determine network conditions such as available network resources and/or corresponding channel quality to support the requested service. In step 312, the broadband gateway 102 may negotiate a service profile for the requested service with the one or more service providers based on the determined network conditions and the identified user profile. In step 314, the determined service profile may be stored by the broadband gateway 102 for content aggregation for the requested service.

Figure 4:
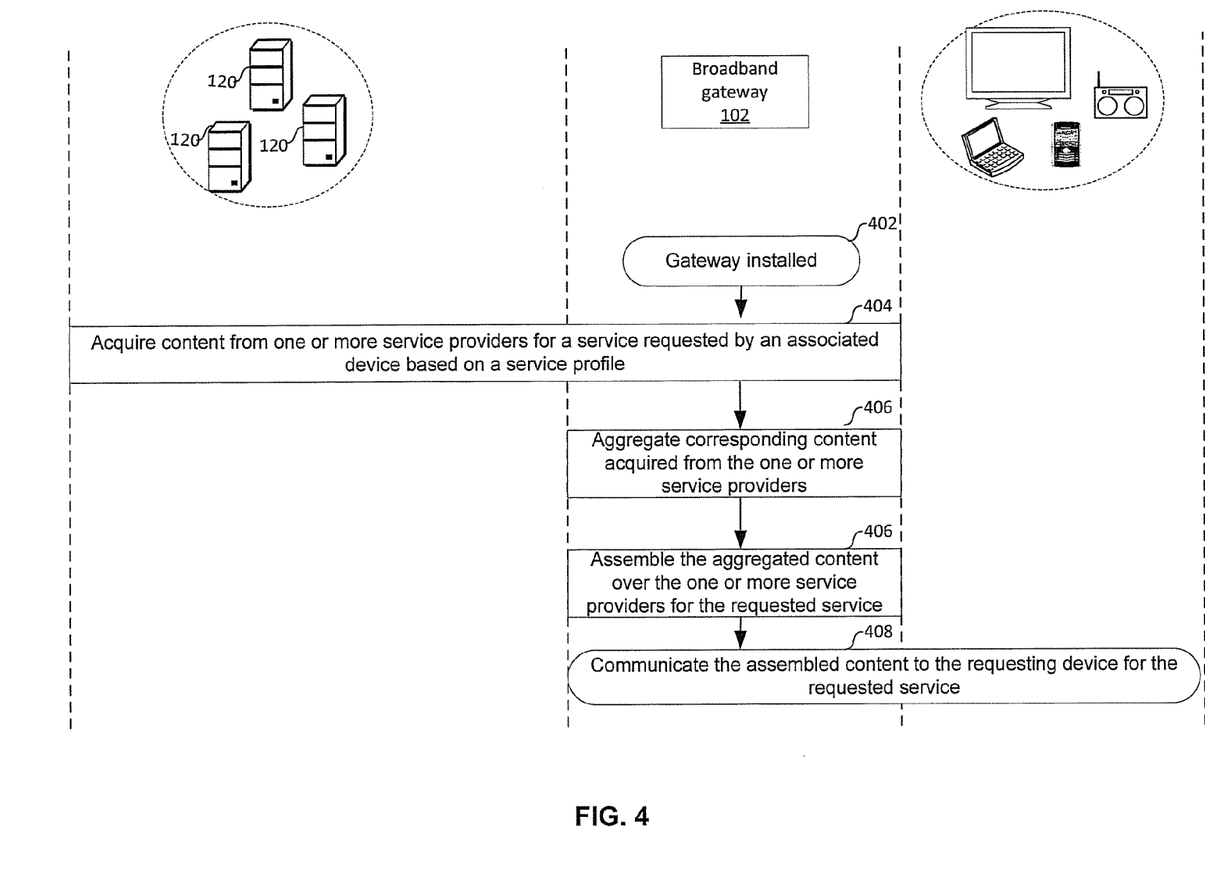
FIG. 4 is a flow chart illustrating exemplary steps that may be performed by a broadband gateway to assemble content aggregated from one or more service providers for a requested service, in accordance with an embodiment of the invention.

FIG. 4 is a flow chart illustrating exemplary steps that may be performed by a broadband gateway to assemble content aggregated from one or more service providers for a requested service, in accordance with an embodiment of the invention. Referring to FIG. 4, the exemplary steps may begin with step 402, in which a broadband gateway 102 may interface with the devices 104 and the service/content providers via the distribution network(s) 110. In step 404, the broadband gateway 102 may acquire content for a requested service that is supported by one or more service providers. Each service provider may provide at least a portion of content required for the requested service. Content provided by each of the one or more service providers may overlap or may comprise different portions of content for the requested service. In step 406, the broadband gateway 102 may aggregate corresponding content acquired from the one or more service providers. In step 408, the broadband gateway 102 may assemble or combine the aggregated content over the one or more service providers for the requested service. In step 410, the assembled content may be communicated to the device 104b for the requested service.

Figure 5:
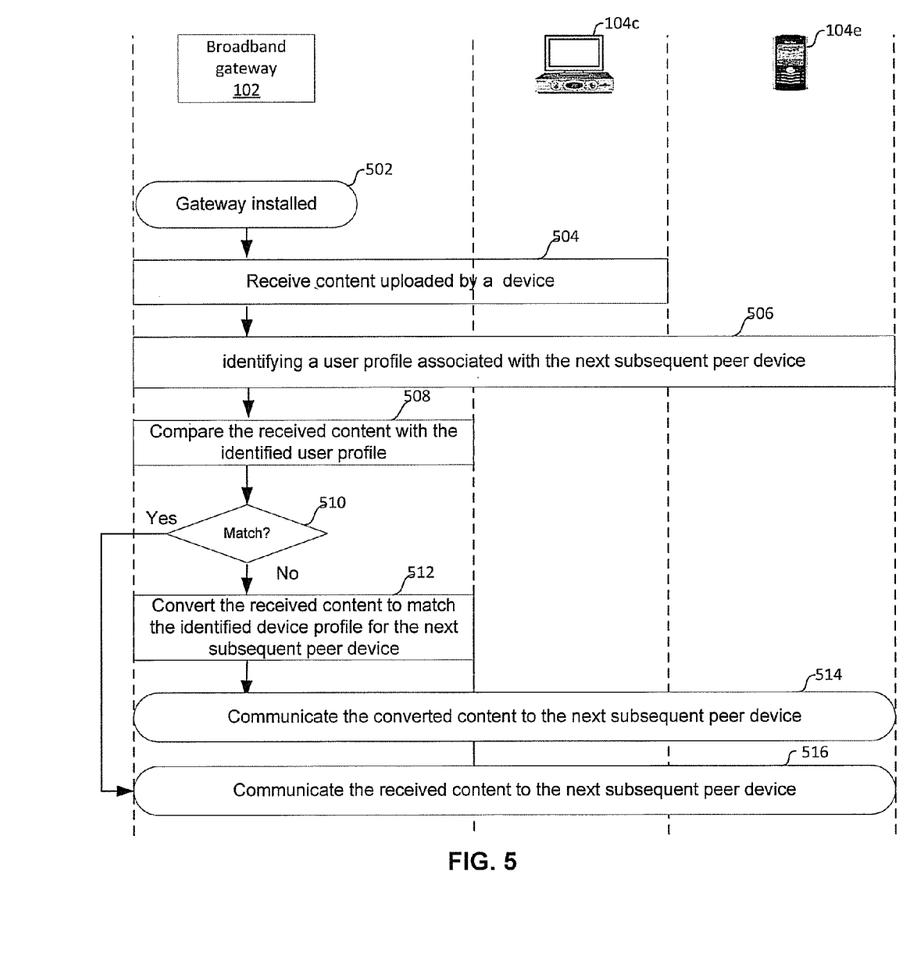
FIG. 5 is a flow chart illustrating exemplary steps that may be performed by a broadband gateway for content relay utilizing peer-to-peer technology in a home network, in accordance with an embodiment of the invention.

FIG. 5 is a flow chart illustrating exemplary steps that may be performed by a broadband gateway for content relay utilizing peer-to-peer technology in a home network, in accordance with an embodiment of the invention. Referring to FIG. 5, the exemplary steps may begin with step 502, in which a broadband gateway 102 may interface with the devices 104 for a peer-to-peer service. In step 504, the broadband gateway 102 may be operable to receive content uploaded by a device such as the device 104a. In step 506, the broadband gateway 102 may identify a user profile associated with the next subsequent peer device such as the device 104b. In step 508, the broadband gateway 102 may compare the received content from the device 104a utilizing criteria such as, for example, content quality, transmission rate and/or content formats, with the identified user profile for the device 104b.

In step 510, the broadband gateway 102 may determine whether the received content from the device 104a matches the identified user profile for the device 104b. In instance where the received content does not match the identified user profile for the device 104b, then in step 512, the broadband gateway 102 may convert the received content from the device 104a to match or fit the identified user profile associated with the device 104b. In step 514, the broadband gateway 102 may relay or communicate the converted content to the next subsequent peer device, namely, the device 104b, for the peer-to-peer service.

In step 510, in instance where the received content matches the identified user profile for the device 104b, then in step 516. The broadband gateway 102 may relay or communicate the received content from the device 104a to the next subsequent peer device, namely, the device 104b, for the peer-to-peer service.

Various aspects of a method and system for content aggregation via a broadband gateway are provided. In various exemplary embodiments of the invention, a broadband gateway 102, which, enables communication with a plurality of devices 104, is operable to handle at least one physical layer connection to at least one corresponding network access service provider. The at least one physical layer connection may comprise a plurality of physical layer connections such as the physical layer connections $210_1$-$210_J$ and the at least one corresponding network access service provider may comprise a plurality of corresponding access service providers such as the service providers 120 and/or the content providers 130. Each of the plurality of physical layer connections $210_1$-$210_J$ corresponds to a respective one of the plurality of corresponding access service providers. The broadband gateway 102 may be operable to receive a service request from, for example, the device 104a. The broadband gateway 102 may be operable to determine network conditions for the requested service and identify an associated user profile associated with the device 104a. The broadband gateway 102 may negotiate a service profile for the requested service with the at least one network access service provider based on the determined network conditions and the identified user profile for the device 104a. The broadband gateway 102 may receive content for the requested service from the at least one network access service provider based on the service profile.

The determined network conditions may comprise one or more service providers providing content for the requested service, available network resources and network quality. The identified user profile for the device 104a may comprise device power usage information, device service processing capabilities and/or user selections. The service profile may comprise type of service, type of content, service providers, network connections and corresponding quality of service (QoS) for the requested service. The one or more service providers each may provide at least a portion of content for the requested service. Depending on system configuration, the one or more service providers may provide one or more same portions of content and/or one or more different portions of content for the requested service. In addition, the one or more service providers may provide content comprising different content quality, content format and/or transmission rates for the requested service. The broadband gateway 102 may acquire corresponding content for the requested service from the one or more service providers utilizing the service profile. The broadband gateway 102 may aggregate or accumulate the corresponding acquired content from the one or more service providers. The corresponding aggregated content may be assembled over the one or more service providers for the requested service.

The broadband gateway 102 may communicate or provide the assembled content to the device 104a for the requested service. The broadband gateway 102 may be operable to relay content among peer devices such as the devices 104a-104j within the home network 100a for a peer-to-peer service. In this regard, the broadband gateway 102 may perform content conversion during the relay communication to match a user profile of the next subsequent peer device. For example, the broadband gateway 102 may receive content uploaded by, for example, the device 104a. Before delivering the received content to the next subsequent peer device such as the device 104b, the broadband gateway 102 may compare the received content, for example, content quality and/or content format, with a user profile associated with the device 104b. The received content may be converted to match the user profile associated with the device 104b. The broadband gateway 102 may relay or communicate the converted content to the device 104b for the peer-to-peer service.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for content aggregation via a broadband gateway.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking, the method comprising:
in a broadband gateway that enables communication with a plurality of devices, wherein said broadband gateway is configured to handle at least one physical layer connection to at least one network access service provider:
identifying a user profile associated with one of said plurality of devices for a service requested by said one of said plurality of devices;
determining network conditions for said at least one network access service provider to support said requested service;
negotiating a service profile with said at least one network access service provider based on said identified user profile and said determined network conditions; and
receiving content from said at least one network access service provider for said requested service based at least in part on said negotiated service profile;
aggregating said received content from said at least one network access service provider;
assembling said aggregated content from said at least one network access service provider for said requested service; and
communicating said assembled content to said one of said plurality of devices based on said identified user profile;
converting content received from at least said plurality of devices or said at least one network access service provider to match the user profile associated with another device of said plurality of devices; and
relaying said converted content to said another device of said plurality of devices based on said user profile associated with said another device of said plurality of devices.

2. The method of claim 1, wherein said at least one physical layer connection comprises a plurality of physical layer connections and said at least one network access service provider comprises a plurality of network access service providers, and wherein, each of said plurality of physical layer connections corresponds to a respective one of said at least one network access service provider.

3. The method according to claim 1, wherein:
said identified user profile comprises at least one of device power usage information and user selections;
said determined network conditions comprise one or more of said at least one network access service provider supporting said requested service, available network resources or network quality; and
said service profile comprises type of service, type of content, service providers, network connections or corresponding quality of service (QoS) for said requested service.

4. The method according to claim 1, wherein said at least one network access service provider provide one or more different portions of content or one or more same portions of content for said requested service.

5. The method according to claim 1, comprising acquiring corresponding content from said one or more of said at least one network access service provider for said requested service based on said service profile.

6. A system for networking, the system comprising:
one or more circuits, one or more processors, or any combination thereof for use in a broadband gateway that enables communication with a plurality of devices, wherein said broadband gateway is configured to handle at least one physical layer connection to at least one network access service provider, the one or more circuits, one or more processors, or any combination thereof being configured to implement:
a processor module configured to identify a user profile associated with one of said plurality of devices for a service requested by said one of said plurality of devices; determine network conditions for said at least one network access service provider to support said requested service; and negotiate a service profile with said at least one network access service provider based on said identified user profile and said determined network conditions;
a provider interface module configured to receive the content from said at least one network access service provider for said requested service based on said negotiated service; wherein the processor module is further configured to aggregate said received content from said at least one network access service provider; assemble said aggregated content over said at least one network access service provider for said requested service; communicate said assembled content to said one of said plurality of devices based on said identified user profile; and convert content received from at least said plurality of devices or said at least one network access service provider to match a user profile associated with another device of said plurality of devices; and
a network interface module configured to relay said converted content to said another device of said plurality of devices based on said user profile associated with said another device of said plurality of devices.

7. The system according to claim 6, wherein said at least one physical layer connection comprises a plurality of physical layer connections and said at least one network access service provider comprises a plurality of network access service providers, and wherein each of said plurality of physical layer connections corresponds to a respective one of said plurality of network access service providers.

8. The system according to claim 6, wherein:
said identified user profile comprises at least one of device power usage information and user selections;
said determined network conditions comprise one or more of said at least one network access service provider supporting said requested service, available network resources and network quality; and
said service profile comprises type of service, type of content, service providers, network connections or corresponding quality of service (QoS) for said requested service.

9. The system according to claim 6, wherein said one or more of said plurality of network access service providers provide one or more different portions of content or one or more same portions of content for said requested service.

10. The system according to claim 6, wherein said provider interface module is configured to acquire corresponding content from said at least one network access service provider for said requested service based on said service profile.

11. A broadband gateway device for networking, the device comprising:
one or more circuits, one or more processors, or any combination thereof that enable communication with a plurality of computing devices, wherein the broadband gateway device is configured to handle at least one physical layer connection to at least one network access service provider, said one or more circuits being configured to implement:
a processor module configured to identify a user profile associated with one of said plurality of computing devices for a service requested by said one of said plurality of computing devices; determine network conditions for said at least one network access service provider to support said requested service; and negotiate a service profile with said at least one network access service provider based on said identified user profile and said determined network conditions;
a provider interface module configured to acquire content from said at least one network access service provider for said requested service based on said negotiated service profile; wherein the processor module is further configured to aggregate said acquired content from said at least one network access service provider; assemble said aggregated content for said requested service; communicate said assembled content to said one of said plurality of devices based on said identified user profile; and convert content received from said one of said plurality of devices to match the user profile associated with another device of said plurality of devices; and
a network interface module configured to relay said converted content to said another device of said plurality of devices based on said user profile associated with said another device of said plurality of devices,
said one of said plurality of devices and said another device of said plurality of devices comprise peer devices within a local network.

12. The method according to claim 1, comprising converting at least a portion of said content received from said at least one network access service provider to match said user profile associated with said another device of said plurality of devices.

13. The method according to claim 1, comprising comparing the content received from the at least said plurality of devices or said at least one network access service provider, with said user profile associated with said another device of said plurality of devices.

14. The method according to claim 1, comprising receiving content from a second device of said plurality of devices, and converting said content received from the second device to match said identified user profile or a user profile of a third device of said plurality of devices.

15. The system according to claim 6, wherein said processor module is configured to convert at least a portion of said content received from said at least one network access service provider to match said user profile associated with said another device of said plurality of devices.

16. The system according to claim 6, wherein said processor module is configured to compare the content received from the at least said plurality of devices or said at least one network access service provider, with said user profile associated with said another device of said plurality of devices.

17. The broadband gateway device of claim 11, wherein:
said identified user profile comprises at least one of device power usage information and user selections;
said determined network conditions comprise one or more of said at least one network access service provider supporting said requested service, available network resources and network quality; and
said service profile comprises type of service, type of content, service providers, network connections or corresponding quality of service (QoS) for said requested service.

18. The broadband gateway device of claim 11, wherein said one or more of said plurality of network access service providers provide one or more different portions of content or one or more same portions of content for said requested service.

19. The broadband gateway device of claim 11, wherein said processor module is configured to convert at least a portion of said content acquired from said at least one network access service provider to match said user profile associated with said another device of said plurality of computing devices.

20. The broadband gateway device of claim 11, wherein said processor module is configured to compare the content received from said one of said plurality of computing devices with said user profile associated with said another device of said plurality of computing devices.

* * * * *